Aug. 19, 1969    J CURTIS EARL    3,461,634
COLLAPSIBLE GRILL
Filed Dec. 29, 1967

INVENTOR
J CURTIS EARL
BY
Warren H. F. Schmieding
ATTORNEY

United States Patent Office 3,461,634
Patented Aug. 19, 1969

3,461,634
COLLAPSIBLE GRILL
J Curtis Earl, 3022 E. Diamond, Phoenix, Ariz. 85008
Filed Dec. 29, 1967, Ser. No. 694,542
Int. Cl. A47j 37/06; F24b 3/00
U.S. Cl. 52—645                                    10 Claims

ABSTRACT OF THE DISCLOSURE

A collapsible grill comprising a plurality of grill rods, each of the opposite ends of which are interconnected, respectively, with interconnected links, preferably in the form of two chains. The chains are supported by tubes, each having a longitudinally extending slot for receiving links of the chain to retain the rods in spaced grill-like position.

BACKGROUND OF THE INVENTION

Field of the invention

The invention is directed to a grill used primarily for cooking food.

Description of the prior art

The prior art, known to applicant, merely discloses non-collapsible grills.

SUMMARY OF THE INVENNTION

The grill of the present invention comprises two tubes which are longitudinally slotted. A plurality of food supporting members, herein shown as rods, have their opposite ends connected, respectively, by interconnected links to form as assembly. Each of these sets of links extend into one of the slots in a tube, and, when so positioned, the assembly and the tubes form a stable grill. While it is desirable that only the outer members are in the form of rods, for the sake of simplicity of manufacture, all of the members are in the form of rods.

Other features and the advantages of the present invention will be apparent from the following description, reference being had to the accompanying drawings wherein a preferred embodiment of the invention is illustrated.

DESCRIPTION OF THE PREFERRED EMBODIMENT

Figure 1:
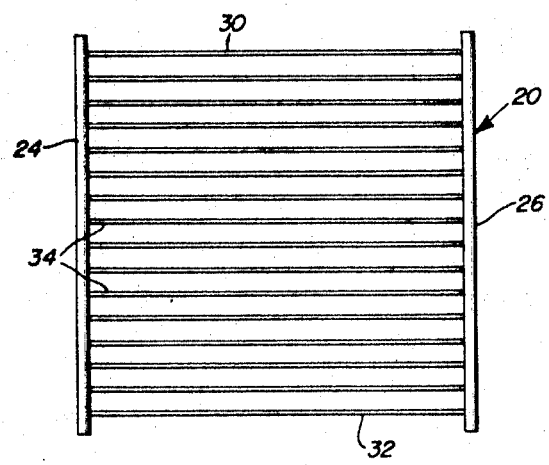
FIG. 1 is a top plan view of the grill, showing the same in stable position for supporting an object.

Referring more in detail to the drawing, the grill 20 comprises two stable supports, herein shown as tubes 24 and 26, each being slotted longitudinally and preferably from end to end, the slot in tube 24 being shown at 28; a similar slot is formed in tube 26.

A series of members which are arrangeable preferably at right angles to the tubes 24 and 26 are removable connected with the tubes. At least the upper member 30 and the lower member 32, as shown in FIG. 1, are in the form of stable rods, and, preferably all of the intermediate members are also in the form of rods 34.

Figure 7:
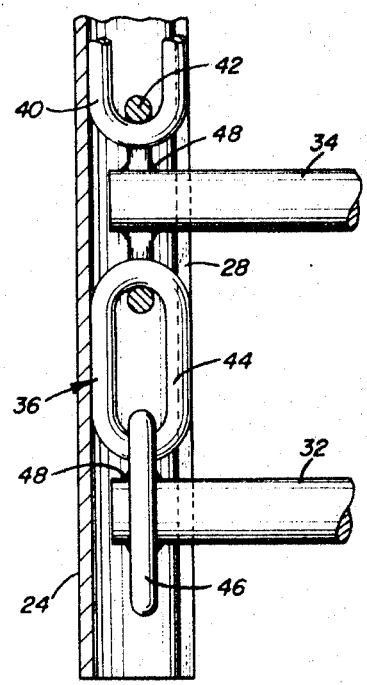
FIG. 7 is a fragmentary view of the grill, showing one of the tubes, some of the links and rods, the rods being welded to the links, part of one of the links being shown in section.
Figure 5:
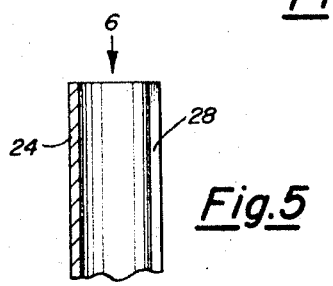
FIG. 5 is a fragmentary sectional view of a rod support taken along line 5—5 of FIG. 3, but on a larger scale.
Figure 6:
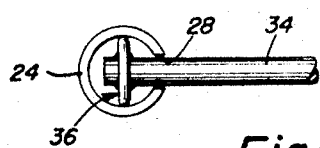
FIG. 6 is an end plan view of a rod support looking in the direction of arrow 6 of FIG. 5.

The members 30, 32 and 34 are connected with one another by two sets 36 and 38 of interconnected links; each set forms a chain. A fragment of the chain 36 is shown more clearly in FIG. 7, wherein only four of the interconnected loop type links are shown at 40, 42, 44 and 46. Rod 34 is secured preferably by welding 48 to the inner surface of link 42. Lower link 32 is secured to the lowest link 46. An independently movable link 44 is linked with links 42 and 46. While not specifically shown, it will be understood that links like links 40 and 44 are linked with links like links 42 and 46, and rods 34 and 32 are secured to links like links 42 and 46.

The sets 36 and 38 of links are received, respectively, by the slots 28 in the tubes 24 and 26 in any suitable manner, and, when so received, they are retained in position, to provide the grill 20.

The width of links such as links 42 and 46, to which the rods 30, 32 and 34 are secured, is wider than the width of the slot 28, whereby when the chains are in position in the tubes 24 and 26, the assembly of the chains and rods are held in position, the rods functioning as grill rods.

Figures 2, 3, 4:
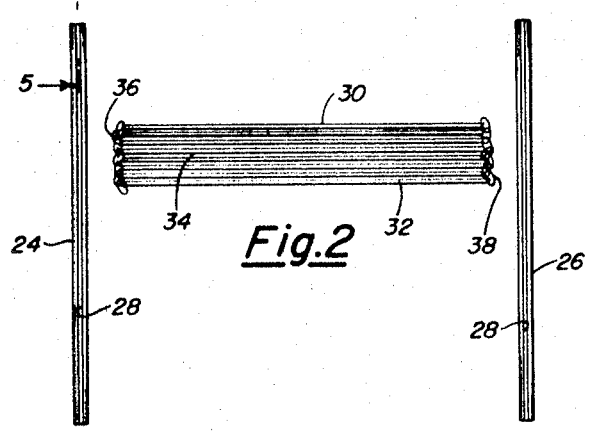
FIG. 2 is a view of the rods in collapsed and in gathered position.
FIGS. 3 and 4 are side views of the rod supports in the form of tubes.

Preferably, the slots 28 are coextensive with the tubes 24 and 26 and the chains 36 and 38 and the tubes are slipped over the chains through the slots 28. When it is desirable to collapse the grill 20, it is necessary only to withdraw the tubes from the chains. Thereafter, the rods 30, 32 and 34 can be gathered into a bundle as shown in FIG. 2.

The collapsible grill has many uses, as for example at outdoor picnics. The grill 20, when in stable position, as shown in FIG. 1, can be supported by suitable stones, either by rods 30 and 32 or by the tubes 24 and 26. After being used, it can be collapsed into a small bundle, the tubes being arranged parallelly with the rods.

While the form of embodiment herein shown and described constitutes a preferred form, it is to be understood that other forms may be adopted falling within the scope of the claims that follow.

I claim:
1. A collapsible grill comprising in combination:
  (A) a pair of rods arranged substantially parallelly with one another;
  (B) a plurality of elongated members arranged substantially parallelly with one another;
  (C) a set of interconnected links connecting one end of each of the rods and one end of each of the members;
  (D) a second set of interconnected links connecting the opposite ends of the rods and the opposite ends of each of the members;
  (E) an elongated and stable element, said element being:
    (1) slotted for receiving and retaining at least certain of the first mentioned links;
  (F) a second elongated and stable element, said latter element being:
    (1) slotted for receiving and retaining at least certain of the second mentioned links.
2. A collapsible grill as defined in claim 1, characterized in that each of the sets of links is in the form of a chain, the links being of the interconnected loop type.
3. A collapsible grill as defined in claim 1, characterized in that the members are in the form of rods.
4. A collapsible grill as defined in claim 1, characterized in that each of the set of links (C) and (D) include:
  (1) at least one independently movable link connected with a rod and with a member;
  (2) at least one independently movable link, connected with said rod and with another of the members.

5. A collapsible grill as defined in claim 1, characterized in that each of the elements (E) and (F) is in the form of a tube, each having single elongated slot opened at least at one end of the tube.

6. A collapsible grill as defined in claim 1, characterized in that the width of the link which is received by a slot is wider than the width of the slot.

7. A collapsible grill as defined in claim 2, characterized in that each chain includes:
 (1) at least one independently movable link connected with a rod and with a member;
 (2) at least one independently movable link, connected with said rod and with another of the members.

8. A collapsible grill as defined in claim 5, characterized in that each of the sets of links is in the form of a chain, the links being of the interconnected loop type, each chain includes:
 (1) at least one independently movable link connected with a rod and with a member;
 (2) at least one independently movable link, connected with said rod and with another of the members.

9. A collapsible grill as defined in claim 6, characterized in that each chain includes:
 (1) at least one independently movable link connected with a rod and with a member,
 (2) at least one independently movable link, connected with said rod and with another of the members.

10. A collapsible grill as defined in claim 9, characterized in that each of said members is in the form of a rod and that each of the sets of links is in the form of a chain, the links being of the interconnected loop type.

References Cited

UNITED STATES PATENTS

| | | | |
|---|---|---|---|
| 1,244,357 | 10/1917 | Moore | 126—30 X |
| 2,839,043 | 6/1958 | Born | 126—30 |

FREDERICK KETTERER, Primary Examiner

U.S. Cl. X.R.

52—669; 99—449; 126—30